(12) United States Patent
Ogasahara (10) Patent No.: US 9,143,756 B2
(45) Date of Patent: Sep. 22, 2015

(54) CAMERA MODULE, PHOTOGRAPHING METHOD, AND ELECTRONIC APPARATUS (75) Inventor: Takayuki Ogasahara, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 918 days.

(21) Appl. No.: 13/353,537

(22) Filed: Jan. 19, 2012

(65) Prior Publication Data

US 2012/0188336 A1 Jul. 26, 2012

(30) Foreign Application Priority Data

Jan. 26, 2011 (JP) ................................. 2011-013946

(51) Int. Cl.
H04N 5/00 (2011.01)
H04N 13/00 (2006.01)
H04N 5/357 (2011.01)

(52) U.S. Cl.
CPC .......... *H04N 13/0025* (2013.01); *H04N 5/3572* (2013.01)

(58) Field of Classification Search
CPC ......................... H04N 13/0025; H04N 5/3572
See application file for complete search history.

(56) References Cited

U.S. PATENT DOCUMENTS

| 2010/0296807 | A1* | 11/2010 | Pupulin et al. | 396/428 |
| 2011/0234824 | A1 | 9/2011 | Ogasahara | |
| 2011/0292182 | A1 | 12/2011 | Ogasahara | |
| 2011/0298900 | A1* | 12/2011 | Inaba | 348/47 |
| 2012/0105611 | A1* | 5/2012 | Godar | 348/54 |
| 2012/0140044 | A1* | 6/2012 | Galstian et al. | 348/47 |
| 2012/0188336 | A1* | 7/2012 | Ogasahara | 348/43 |
| 2012/0257024 | A1* | 10/2012 | Inaba | 348/49 |

FOREIGN PATENT DOCUMENTS

| JP | 6-133339 | 5/1994 |
| JP | 2007-208704 | 8/2007 |
| JP | 2007-335944 | 12/2007 |
| JP | 2010-154310 | 7/2010 |

* cited by examiner

Primary Examiner — Jay Patel
Assistant Examiner — Frank Huang
(74) Attorney, Agent, or Firm — Oblon, McClelland, Maier & Neustadt, L.L.P.

(57) ABSTRACT

According to one embodiment, a camera module has a first image sensor, a second image sensor and an image processing apparatus. The image processing apparatus outputs an image signal for a stereoscopic display. A second sub-camera module including the second image sensor has a signal processing unit. The second image is acquired by the second sub-camera module. The signal processing unit executes signal processing for adjusting a second image corresponding to a difference between the numbers of pixels of the first image sensor and the second image sensor.

16 Claims, 5 Drawing Sheets

CAMERA MODULE, PHOTOGRAPHING METHOD, AND ELECTRONIC APPARATUS

CROSS-REFERENCE TO RELATED APPLICATIONS

This application is based upon and claims the benefit of priority from Japanese Patent Application No. 2011-013946, filed on Jan. 26, 2011; the entire contents of all of which are incorporated herein by reference.

FIELD

Embodiments described herein relate generally to a camera module, a photographing method, and an electronic apparatus.

BACKGROUND

Conventionally, a camera module including a plurality of sub-camera modules for capturing a subject image is used for photographing a stereoscopic image (3D), for example. The camera module uses one of the sub-camera modules in an operation for normally photographing a planar view image. Consequently, it is possible to switch an operation for photographing a stereoscopic image and an operation for photographing a planar view image. The sub-camera modules having almost equal performances to each other are conventionally used for photographing the stereoscopic image. In this case, if a main sub-camera module to be used for photographing a planar view image has a high performance, the high performance is demanded for the other sub-camera modules. For this reason, there is a problem in that a manufacturing cost of the camera module is considerably increased.

DETAILED DESCRIPTION

In general, according to one embodiment, a camera module includes a first sub-camera module, a second sub-camera module, and an image processing apparatus. The first sub-camera module has a first image sensor. The first image sensor captures a subject image. The second sub-camera module has a second image sensor. The second image sensor captures a subject image. The image processing apparatus fetches a first image and a second image. The image processing apparatus outputs an image signal for a stereoscopic display. The first image is acquired by the first sub-camera module. The second image is acquired by the second sub-camera module. The second image sensor is constituted to have a different number of pixels from that of the first image sensor. The second sub-camera module has a signal processing unit. The signal processing unit executes signal processing for adjusting the second image depending on a difference in the number of the pixels between the first and second image sensors.

Exemplary embodiments of a camera module, a photographing method, and an electronic apparatus will be explained below in detail with reference to the accompanying drawings. The present invention is not limited to the following embodiments.

Figure 1:
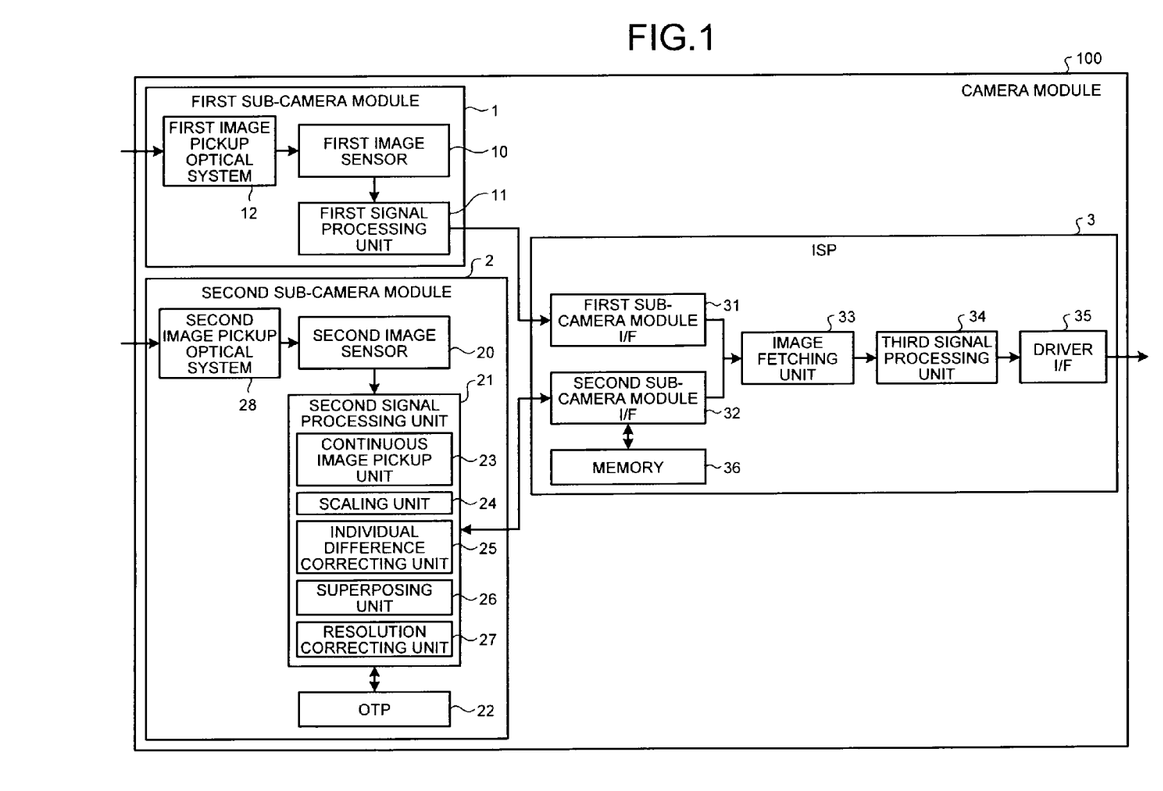
FIG. 1 is a block diagram illustrating a structure of a camera module according to a first embodiment.
Figure 2:
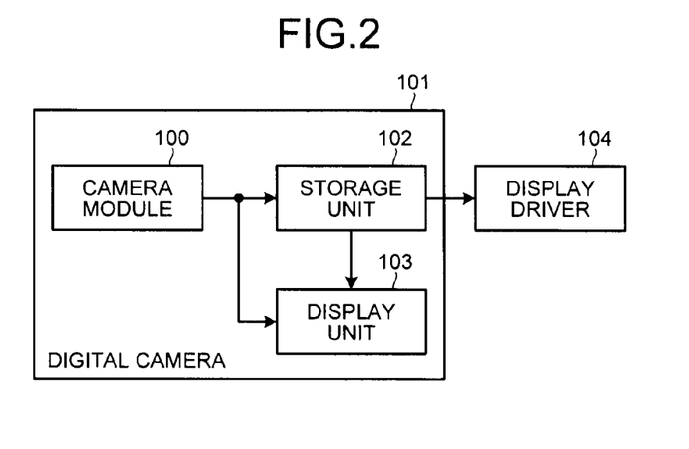
FIG. 2 is a block diagram illustrating a structure of a digital camera to be an electronic apparatus including the camera module illustrated in FIG. 1.

FIG. 1 is a block diagram illustrating a structure of a camera module according to a first embodiment. FIG. 2 is a block diagram illustrating a structure of a digital camera to be an electronic apparatus including the camera module illustrated in FIG. 1.

A digital camera 101 has a camera module 100, a storage unit 102, and a display unit 103. The camera module 100 captures a subject image. The storage unit 102 stores an image photographed by the camera module 100. The display unit 103 displays an image photographed by the camera module 100. The display unit 103 is a liquid crystal display, for example.

The camera module 100 outputs an image signal to the storage unit 102 and the display unit 103 by capturing a subject image. The storage unit 102 outputs an image signal to the display unit 103 depending on an operation of a user or the like. The display unit 103 displays an image in response to the image signal input from the camera module 100 or the storage unit 102. A display driver 104 displays a stereoscopic image in response to the image signal input from the storage unit 102. The camera module 100 may be applied to an electronic apparatus other than the digital camera 101, for example, a portable telephone having a camera or the like.

The camera module 100 has a first sub-camera module 1, a second sub-camera module 2, and an ISP (Image Signal Processor) 3.

The first sub-camera module 1 has a first image sensor 10, a first signal processing unit 11 and a first image pickup optical system 12.

The first image pickup optical system 12 fetches a light from a subject. The first image sensor 10 converts a light fetched by the first image pickup optical system 12 into a signal charge. The first image sensor 10 captures a subject image.

The first signal processing unit 11 fetches signal values for red (R), green (G), and blue (B) in order corresponding to the Bayer array, thereby generating an analog image signal, and converts the image signal thus obtained from an analog form to a digital form. The first sub-camera module 1 outputs a first RAW image (a first image) obtained via image pickup through the first image sensor 10.

The second sub-camera module 2 has a second image sensor 20, a second signal processing unit 21, an OTP (One Time Programmable memory) 22, and a second image pickup optical system 28.

The second image pickup optical system 28 fetches a light from the subject. The second image sensor 20 converts the light fetched by the second image pickup optical system 28 into a signal charge. The second image sensor 20 picks up a subject image. The second image sensor 20 is constituted to have a smaller number of pixels than the number of pixels of the first image sensor 10.

The second signal processing unit 21 fetches the signal values of R, G and B in order corresponding to the Bayer array, thereby generating an analog image signal, and converts the image signal thus obtained from the analog form to the digital form. The second sub-camera module 2 outputs a second RAW image (a second image) obtained via image pickup through the second image sensor 20.

The second signal processing unit 21 functions as a signal processing unit for executing signal processing for adjusting the second RAW image depending on a difference in the number of the pixels between the first image sensor 10 and the second image sensor 20.

The second signal processing unit 21 has a continuous image pickup unit 23, a scaling unit 24, an individual difference correcting unit 25, a superposing unit 26, and a resolution correcting unit 27.

The continuous image pickup unit 23 executes image pickup at a plurality of continuous times for one-time image pickup through the first sub-camera module 1. The scaling unit 24 executes scaling processing for a plurality of images fetched by the image pickup at a plurality of times. In this example, the scaling unit 24 executes upscaling for enlarging a plurality of images up to a size of the first RAW image.

The individual difference correcting unit 25 corrects image quality for the images fetched through the image pickup carried out at the times depending on an individual difference between the first sub-camera module 1 and the second sub-camera module 2. The individual difference correcting unit 25 aligns the images as the correction of the image quality, for example. The individual difference is set to be an error of a lens distortion, a manufacturing error of a component such as a lens, an assembly error of components, a fixing error of the second sub-camera module 2 to the first sub-camera module 1 and the like, for example.

The superposing unit 26 superposes the images fetched through the image pickup carried out at the times, thereby generating the second RAW image. The superposing unit 26 superposes a number of images which corresponds to a signal to noise ratio (SNR) of the first sub-camera module 1. The resolution correcting unit 27 corrects resolution of the second RAW image depending on the resolution of the first RAW image. The OTP 22 holds a parameter to be used in signal processing in the second signal processing unit 21.

The ISP 3 functions as an image processing apparatus for fetching the first RAW image input from the first sub-camera module 1 and the second RAW image input from the second sub-camera module 2, and outputting an image signal for a stereoscopic display. The ISP 3 has a first sub-camera module I/F 31, a second sub-camera module I/F 32, an image fetching unit 33, a third signal processing unit 34, a driver I/F 35, and memory 36.

The first RAW image obtained by the image pickup through the first sub-camera module 1 is fetched from the first sub-camera module I/F 31 into the image fetching unit 33. The second RAW image obtained by the image pickup through the second sub-camera module 2 is fetched from the second sub-camera module I/F 32 into the image fetching unit 33.

The third signal processing unit 34 executes signal processing over the first RAW image and the second RAW image which are fetched into the image fetching unit 33. The driver I/F 35 reads the image signal subjected to the signal processing through the third signal processing unit 34 from the third signal processing unit 34 and outputs the read image signal to the storage unit 102 and the display unit 103.

The memory 36 functions as a holding unit for holding a plurality of images fetched through the image pickup carried out at the times. The superposing unit 26 of the second sub-camera module 2 superposes a plurality of images read from the memory 36.

Figure 3:
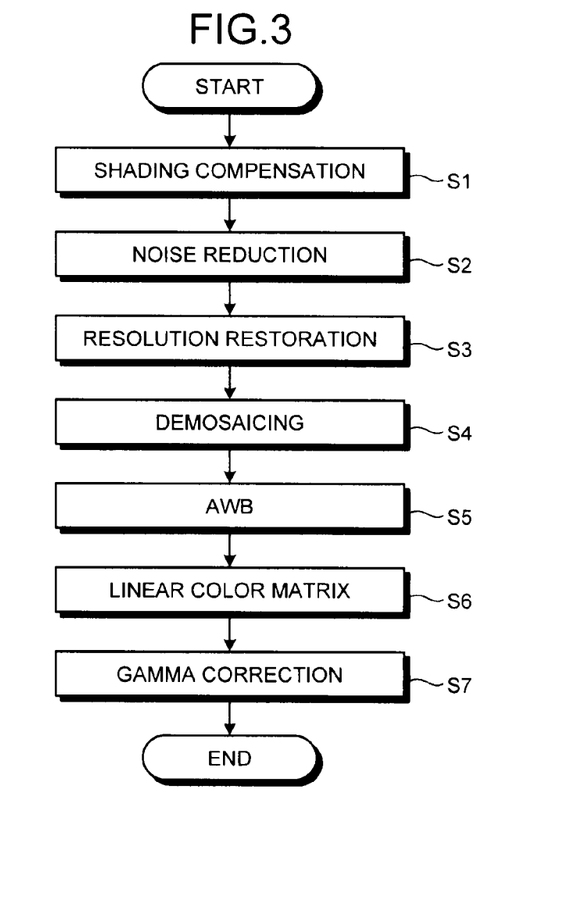
FIG. 3 is a flow chart for explaining a procedure for signal processing through a third signal processing unit.

FIG. 3 is a flow chart for explaining a procedure for the signal processing to be carried out by the third signal processing unit. The third signal processing unit 34 executes shading compensation for each of the first RAW image obtained by the image pickup through the first sub-camera module 1 and the second RAW image obtained by the image pickup through the second sub-camera module 2 (Step S1). In the shading compensation, there is corrected uneven brightness caused by a difference between light quantities of central and peripheral parts which are caused by the first and second image pickup optical systems 12 and 28.

The third signal processing unit 34 executes a noise reduction for removing a noise such as a fixed pattern noise, a dark current noise or a shot noise (Step S2) and resolution restoration processing (Step S3).

Next, the third signal processing unit 34 executes pixel interpolation processing (demosaicing) over the digital image signal transmitted in order of the Bayer array (Step S4). In the demosaicing, a sensitivity level value of an insufficient color component is generated by the interpolation processing for the image signal obtained through the image pickup for the subject image. The third signal processing unit 34 synthesizes color images for the first sub-camera module 1 and the second sub-camera module 2 through the demosaicing.

The third signal processing unit 34 executes automatic white balance control (AWB) over the color image (Step S5). Furthermore, the third signal processing unit 34 executes linear color matrix processing for obtaining color reproducibility (Step S6) and a gamma correction for correcting color saturation or brightness of an image displayed on a display or the like (Step S7).

The procedure for the signal processing illustrated in FIG. 3 is only illustrative and it is also possible to properly carry out addition of other processing, omission of processing which can be omitted, a change of order and the like. The signal processing to be carried out by each element may be executed by the first sub-camera module 1 and the second sub-camera module 2 or the ISP 3 or through sharing.

Figure 4:
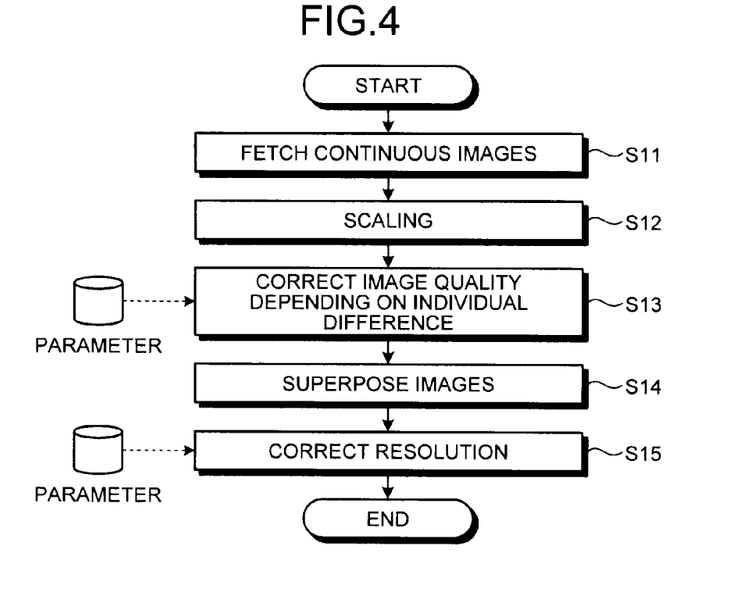
FIG. 4 is a flow chart for explaining a procedure for signal processing through a second signal processing unit.

FIG. 4 is a flow chart for explaining a procedure for the signal processing through the second signal processing unit. The second signal processing unit 21 picks up an image at continuous times synchronously with one-time image pickup in the first sub-camera module 1 through the continuous image pickup unit 23, and fetches the images (Step S11). The memory 36 holds the images fetched by the continuous image pickup unit 23. The scaling unit 24 reads the images stored in the memory 36 and executes the scaling processing (Step S12). The scaling unit 24 enlarges the images fetched through the plural-time image pickup up to an equal size to the first RAW image by upscaling.

The effect of the upscaling depends on an algorithm. The scaling unit 24 can enlarge an image without deteriorating image quality by using a bilinear or bicubic interpolation, for example. The scaling unit 24 may execute the upscaling by using an algorithm other than the bilinear and the bicubic. The camera module 100 can obtain a stereoscopic image adapted to the size of the first RAW image by the application of the scaling processing through the scaling unit 24.

The individual difference correcting unit 25 corrects the image quality depending on the individual difference between the first sub-camera module 1 and the second sub-camera module 2 for the images subjected to the scaling processing in the scaling unit 24 (Step S13). The individual difference correcting unit 25 reads a parameter written to the OTP 22 in a manufacture of the camera module 100 and uses the parameter for a calculation for correcting the image quality.

For example, a parameter for correcting a lens distortion is set to be a correction coefficient obtained from a result of the photographing of an adjusting chart through the first sub-camera module 1 and the second sub-camera module 2 in the manufacture of the camera module 100. The correction coefficient is obtained as a factor of a coordinate transformation for causing an adjusting marker photographed by the second sub-camera module 2 to be coincident with an adjusting marker photographed by the first sub-camera module 1 based on the chart photographed by the first sub-camera module 1.

The correction coefficient is set to be a coefficient of a matrix operation. The correction coefficient is obtained in accordance with the following equation based on the least squares method, for example.

$$Y = kX$$

$$k = YX^t [XX^t]^{-1}$$

k represents a correction coefficient, both Y and X represent coordinates of the adjusting markers, Y represents coordinates calculated from an image obtained by the first sub-camera module 1, and X represents coordinates calculated from an image obtained by the second sub-camera module 2. $X^t$ represents a transposed matrix of X. $[XX^t]^{-1}$ represents an inverse matrix of $XX^t$. The correction coefficient may be obtained by the least squares method, and furthermore, by using other algorithms, for example, a nonlinear optimization method and the like.

The camera module 100 can reduce a deterioration in the stereoscopic image which is caused by the individual difference between the first sub-camera module 1 and the second sub-camera module 2 through the correction of the individual difference correcting unit 25. The camera module 100 may set a storage destination of a parameter for correcting the individual difference to be the ISP 3 in addition to the OTP 22 of the second sub-camera module 2.

The superposing unit 26 executes a superposition by setting, as a target, a plurality of images subjected to the correction of the individual difference correcting unit 25 (Step S14). The number of the images to be superposed by the superposing unit 26 is set in such a manner that SNR to be implemented by the superposition of the images is almost equal to SNR in the first RAW image.

The superposing unit 26 superposes a number of images which corresponds to the SNR of the first sub-camera module 1, thereby averaging a signal value for each pixel. Consequently, it is possible to obtain the second RAW image having a sensitivity which is almost equal to the sensitivity of the first RAW image. The camera module 100 can obtain a stereoscopic image having a high sensitivity corresponding to the performance of the first sub-camera module 1.

The resolution correcting unit 27 executes the correction of the resolution for the second RAW image obtained by the superposing unit 26 (Step S15). The resolution correcting unit 27 reads a parameter written to the OTP 22 in the manufacture of the camera module 100 and uses the read parameter for an operation to correct resolution.

It is assumed that the parameter for correcting the resolution is obtained from the result of the photographing of an MTF chart by means of the first sub-camera module 1 and the second sub-camera module 2 in the manufacture of the camera module 100. MTF in each of image heights of 0%, 20%, 40%, 60%, and 80% is acquired through the photographing of the MTF chart, for example.

The parameter is obtained as a strength of a resolution correcting filter for causing the MTF of the second sub-camera module 2 to be coincident with the MTF of the first sub-camera module 1 for each image height based on the MTF of the first sub-camera module 1. In the case in which there is a portion to desire high precision, for example, a center of a lens, particularly, the number of markers for MTF measurement may be increased in the vicinity of the coordinates indicative of the position.

The camera module 100 enhances the resolution of the second RAW image corresponding to the resolution of the first sub-camera module 1 through the correction of the resolution correcting unit 27. Consequently, the camera module 100 can photograph a stereoscopic image having a high resolution. The camera module 100 may set the storage destination of the parameter for correcting the resolution into the ISP 3 in addition to the OTP 22 of the second sub-camera module 2.

The second sub-camera module 2 outputs the second RAW image obtained via the above procedure. The camera module 100 uses the second sub-camera module 2 in a smaller number of the pixels than the first sub-camera module 1 to be main. Consequently, it is possible to reduce a manufacturing cost more greatly as compared with the case in which a sub-camera module having the same number of pixels as the first sub-camera module 1 is used.

Moreover, the camera module 100 can reduce a deterioration in image quality due to the influence of the difference between the numbers of the pixels of the first sub-camera module 1 and the second sub-camera module 2 or the individual difference, thereby photographing a stereoscopic image having high quality. The camera module 100 sets the images for a stereoscopic display to have equivalent image quality to each other, thereby relieving a discomfort more greatly as compared with the case in which the images having different image quality from each other are used.

The second signal processing unit 21 may properly change the procedure for each processing from the Step S12 to the Step S15. The scaling unit 24 may execute the scaling processing for the second RAW image obtained by the superposing unit 26. The individual difference correcting unit 25 may execute a correction for the second RAW image obtained by the superposing unit 26.

The second signal processing unit 21 may correct a sensitivity difference in each color (RGB) between the first sub-camera module 1 and the second sub-camera module 2 for either the images fetched through the image pickup carried out at a plurality of times or the second RAW image obtained by the superposing unit 26. For example, the sensitivity difference in the RGB is obtained for each color component as a ratio of the sensitivity level obtained by the second sub-camera module 2 to the sensitivity level obtained by the first sub-camera module 1. The second signal processing unit 21 can correct the sensitivity difference in the RGB through a multiplication of the sensitivity ratios of the respective colors by setting, as a target, the image obtained by the second sub-camera module 2.

Figure 5:
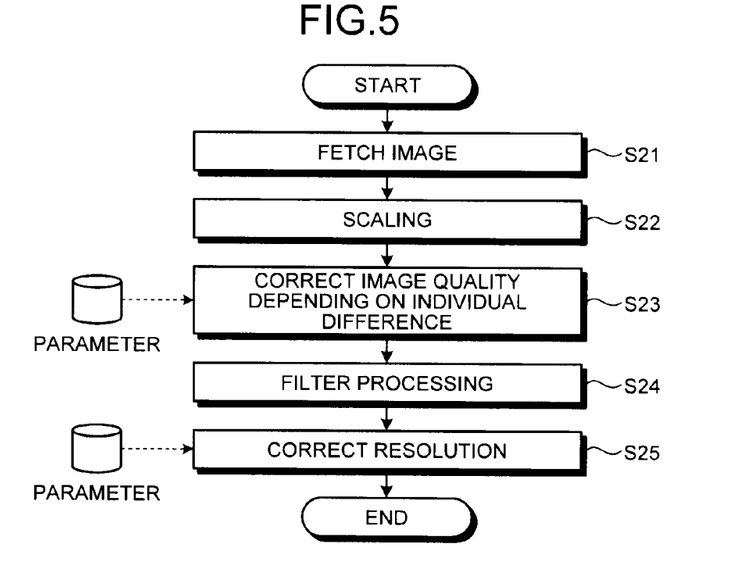
FIG. 5 is a flow chart for explaining the procedure for the signal processing through the second signal processing unit according to a variant of the first embodiment.

FIG. 5 is a flow chart for explaining the procedure for the signal processing to be executed by the second signal processing unit according to a variant of the first embodiment. In the present variant, the second sub-camera module 2 is constituted to have a larger number of pixels than the first sub-camera module 1. The second signal processing unit 21 carries out one-time image pickup synchronously with the one-time image pickup in the first sub-camera module 1 and fetches an image (Step S21).

The scaling unit 24 executes scaling processing for the image fetched at the Step S21 (Step S22). In this example, the scaling unit 24 executes downscaling of an image to have the size of the first RAW image. The individual difference correcting unit 25 corrects an individual difference for the image subjected to the scaling processing through the scaling unit 24 (Step S23).

The second signal processing unit 21 executes filter processing for adapting an image subjected to the correction in the individual difference correcting unit 25 to the SNR of the first sub-camera module 1 (Step S24) to obtain the second RAW image. The resolution correcting unit 27 corrects the resolution of the second RAW image depending on the resolution of the first RAW image (Step S25).

Also in the present variant, the camera module 100 can obtain a stereoscopic image corresponding to the performance of the first sub-camera module 1. Moreover, the camera module 100 causes the images for a stereoscopic display to have equivalent image quality to each other so that a discomfort can be relieved more greatly as compared with the case in which the images having different quality from each other are used.

The camera module 100 may execute the downscaling over an image photographed by a sub-camera module having a large size in the case in which a large image size is not required in the photographing of moving image, for example. The camera module 100 may execute the downscaling based on an image photographed by a sub-camera module having a small size also in the case in which signal processing having a procedure illustrated in FIG. 4 is executed.

In the camera module 100, the scaling unit may be provided in the first sub-camera module 1 or the second sub-camera module 2. The camera module 100 may execute the scaling processing over the first RAW image or the second RAW image. It is sufficient that the second sub-camera module 2 is constituted to have at least a different number of the pixels from the first sub-camera module 1.

Figure 6:
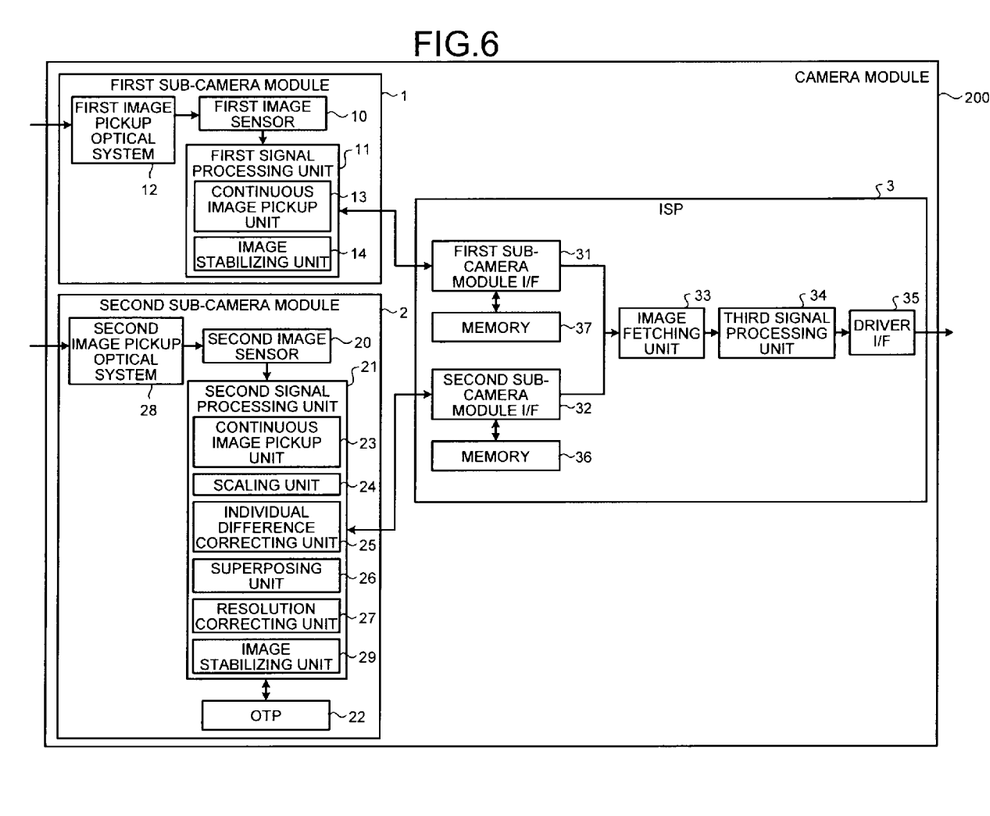
FIG. 6 is a block diagram illustrating a structure of a camera module according to a second embodiment.

FIG. 6 is a block diagram illustrating a structure of a camera module according to a second embodiment. A camera module 200 is applied to the digital camera 101 to be an electronic apparatus (see FIG. 2), for example. The camera module 200 may be applied to an electronic apparatus other than the digital camera 101, for example, a portable telephone having a camera or the like.

The camera module 200 includes a first sub-camera module 1, a second sub-camera module 2 and an ISP 3. The first sub-camera module 1 and the second sub-camera module 2 execute image stabilization. Repetitive description of the first embodiment will be properly omitted.

A first signal processing unit 11 has a continuous image pickup unit 13 and an image stabilizing unit 14. The continuous image pickup unit 13 executes image pickup at a plurality of continuous times in order to carry out the image stabilization through the image stabilizing unit 14. The image stabilizing unit 14 executes the image stabilization for an image fetched through the image pickup at a plurality of times through the continuous image pickup unit 13.

A second image sensor 20 is constituted to have a smaller number of pixels than the first image sensor 10. A second signal processing unit 21 has a continuous image pickup unit 23, a scaling unit 24, an individual difference correcting unit 25, a superposing unit 26, a resolution correcting unit 27, and an image stabilizing unit 29.

The continuous image pickup unit 23 executes image pickup at a plurality of continuous times. The image stabilizing unit 29 executes the image stabilization for the image fetched through the image pickup carried out at a plurality of times. The superposing unit 26 superposes the images subjected to the image stabilization through the image stabilizing unit 29.

The ISP 3 has a first sub-camera module I/F 31, a second sub-camera module I/F 32, an image fetching unit 33, a third signal processing unit 34, a driver I/F 35, and memories 36 and 37.

The memory 36 functions as a holding unit for holding the images fetched by the continuous image pick-up unit 23 of the second sub-camera module 2. The memory 37 functions as a holding unit for holding the images fetched by the continuous image pickup unit 13 of the first sub-camera module 1.

Figure 7:
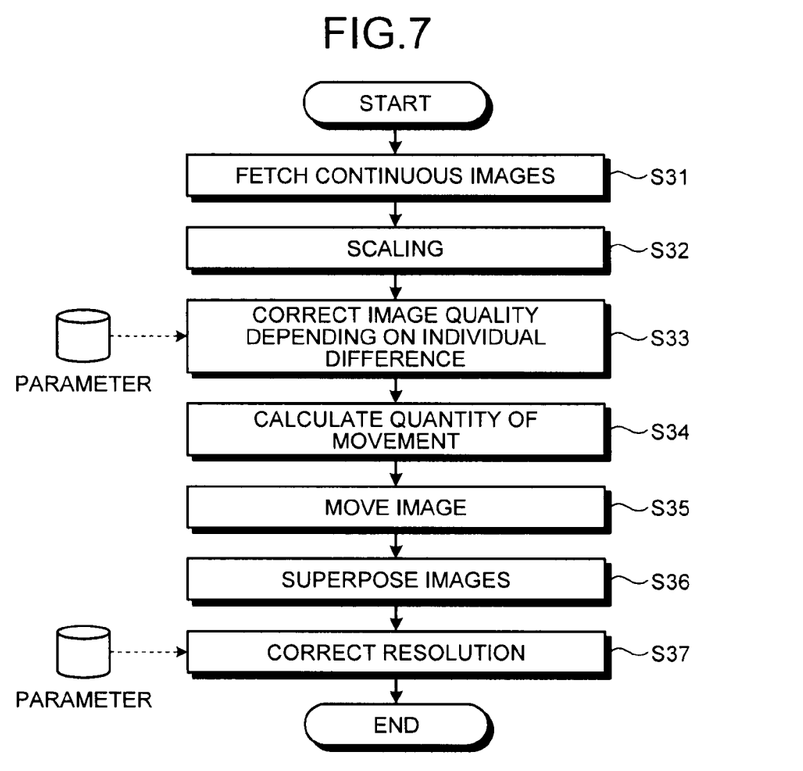
FIG. 7 is a flow chart for explaining a procedure for signal processing through a second signal processing unit.

FIG. 7 is a flow chart for explaining a procedure for signal processing to be executed by the second signal processing unit. The second signal processing unit 21 carries out the image pickup at a plurality of continuous times through the continuous image pickup unit 23 and fetches a plurality of images (Step S31).

The memory 36 holds the images fetched by the continuous image pickup unit 23. The scaling unit 24 reads the images stored in the memory 36 and executes the scaling processing (Step S32). The scaling unit 24 enlarges the images fetched by the image pickup carried out at a plurality of times into the size of the first RAW image through upscaling.

The individual difference correcting unit 25 corrects image quality depending on the individual difference between the first sub-camera module 1 and the second sub-camera module 2 over the images subjected to the scaling processing through the scaling unit 24 (Step S33). The individual difference correcting unit 25 reads a parameter written to the OTP 22 in the manufacture of the camera module 200 and uses the read parameter in an operation for the correction.

The image stabilizing unit 29 calculates a quantity of movement for the image stabilization over the image subjected to the correction through the individual difference correcting unit 25 (Step S34). The image stabilizing unit 29 moves a second image in a transverse direction (an X-axis direction) and a longitudinal direction (a Y-axis direction) in such a manner that the second image is coincident with a first image captured by the continuous image pickup unit 23, for example. The image stabilizing unit 29 obtains a difference between a signal value of the first image and a signal value of the second image for a reference area set to carry out the image stabilization, and acquires a quantity of movement in which the difference is minimized.

The image stabilizing unit 29 refers to a G signal value when obtaining the quantity of movement, for example. Referring to a pixel having an R signal value and a pixel having a B signal value in the respective pixels, the G signal value is generated by the same processing as demosaicing in the third signal processing unit 34 (Step S4 in FIG. 3). The image stabilizing unit 29 moves the second image in accordance with the quantity of movement which is obtained at the Step S34 (Step S35).

The superposing unit 26 superposes the first image on the second image subjected to the movement at the Step S35 (Step S36). The second signal processing unit 21 repeats the procedure from the Step S34 to the Step S36 for a third image and succeeding images which are picked up by the continuous image pickup unit 23. The resolution correcting unit 27 executes the correction of the resolution for the second RAW image obtained by the superposing unit 26 (Step S37).

The first signal processing unit 11 continuously captures an image at a plurality of times by the continuous image pickup unit 13 and fetches a plurality of images. The memory 37 holds the images fetched by the continuous image pickup unit 13. The image stabilizing unit 14 reads the images stored in the memory 37 and executes the image stabilization. The image stabilizing unit 14 of the first signal processing unit 11 executes the image stabilization by the same processing as that in the image stabilizing unit 29 of the second signal processing unit 21. The first sub-camera module 1 sets, as the first RAW image, the image subjected to the image stabilization carried out by the image stabilizing unit 14.

The camera module 200 according to the second embodiment can reduce a manufacturing cost and can photograph a stereoscopic image having high quality in the same manner as the camera module 100 according to the first embodiment. Moreover, the camera module 200 also applies the superposition of the images in the superposing unit 26 to the image stabilization in the second sub-camera module 2, and furthermore, executes the image stabilization also in the first sub-camera module 1. Consequently, it is possible to obtain a stereoscopic image having image stabilization relieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A camera module comprising:
    a first sub-camera module including a first image sensor which is configured to capture a subject image;
    a second sub-camera module including a second image sensor which is configured to capture the subject image; and
    an image processing apparatus which is configured to fetch a first image acquired by the first sub-camera module and a second image acquired by the second sub-camera module, and to output an image signal for a stereoscopic display,
    wherein the second image sensor is constituted to have a smaller number of pixels than a number of pixels of the first image sensor,
    the second sub-camera module has a signal processing unit which is configured to execute signal processing for adjusting the second image depending on a difference between the numbers of the pixels of the first image sensor and the second image sensor,
    the signal processing unit includes:
    a continuous image pickup unit which is configured to execute image pickup at a plurality of continuous times through the second image sensor over one-time image pickup through the first image sensor; and
    a superposing unit which is configured to superpose a plurality of images fetched by the image pickup carried out at the times, thereby forming the second image, and
    the superposing unit superposes a number of images which corresponds to a signal to noise ratio of the first sub-camera module.

2. The camera module according to claim 1, wherein the signal processing unit further has an individual difference correcting unit which is configured to correct image quality depending on an individual difference between the first sub-camera module and the second sub-camera module for either the images fetched by the image pickup carried out at the times or the second image obtained by the superposing unit.

3. The camera module according to claim 1, further comprising a scaling unit which is configured to execute scaling processing depending on a difference between sizes of the first image and the second image over either the first image or the second image.

4. The camera module according to claim 1, wherein the signal processing unit further has a resolution correcting unit which is configured to correct resolution of the second image depending on resolution of the first image.

5. The camera module according to claim 1, wherein the image processing apparatus has a holding unit which is configured to hold the images fetched by the image pickup at the times, and
    the superposing unit superposes the images read from the holding unit on each other.

6. The camera module according to claim 1, wherein the signal processing unit further has a scaling unit which is configured to execute upscaling corresponding to a size of the first image over either the images fetched by the image pickup carried out at the times or the second image obtained by the superposing unit.

7. The camera module according to claim 1, wherein
    the signal processing unit further includes:
    an image stabilizing unit which is configured to execute image stabilization over a plurality of images fetched by the image pickup carried out at the times, and
    the superposing unit superposes the images subjected to the image stabilization through the image stabilizing unit, thereby forming the second image.

8. The camera module according to claim 2, wherein either the second sub-camera module or the image processing apparatus holds a parameter to be used for an operation to correct image quality in the individual difference correcting portion.

9. A photographing method comprising:
    capturing a subject image by a first image sensor provided in a first sub-camera module;
    capturing the subject image by a second image sensor provided in a second sub-camera module;
    fetching a first image acquired through image pickup carried out by the first image sensor and a second image acquired through image pickup carried out by the second image sensor;: and
    generating an image signal for a stereoscopic display,
    wherein the second image sensor is constituted to have a smaller number of pixels than a number of pixels of the first image sensor, and
    signal processing for adjusting the second image depending on a difference between the numbers of the pixels of the first image sensor and the second image sensor is executed, the signal processing including:
    executing image pickup at a plurality of continuous times through the second image sensor over one-time image pickup through the first image sensor; and
    superposing a plurality of images fetched by the image pickup carried out at the times corresponding to a number depending on a signal to noise ratio of the first sub-camera module, thereby forming the second image.

10. The photographing method according to claim 9, wherein the signal processing further includes correcting image quality depending on an individual difference between the first sub-camera module and the second sub-camera module over either the images fetched by the image pickup carried out at the times or the second image obtained by superposing the images on each other.

11. The photographing method according to claim 9, further comprising executing scaling processing depending on a difference between sizes of the first image and the second image over either the first image or the second image.

12. The photographing method according to claim 9, wherein the signal processing further includes correcting resolution of the second image depending on resolution of the first image.

13. The photographing method according to claim 9, wherein the images fetched by the image pickup carried out at the times are held in a holding unit, and
the images read from the holding unit are superposed on each other.

14. The photographing method according to claim 9, wherein the signal processing further includes executing upscaling corresponding to a size of the first image over either the images fetched by the image pickup carried out at the times or the second image obtained by superposing the images on each other.

15. The photographing method according to claim 9, wherein
the signal processing further includes executing
image stabilization over a plurality of images fetched by the image pickup carried out at the times, and
the images subjected to the image stabilization are superposed thereby the second image is formed.

16. An electronic apparatus having a camera module which is configured to record a subject image,
the camera module including:
a first sub-camera module having a first image sensor which is configured to capture a subject image;
a second sub-camera module having a second image sensor which is configured to capture the subject image; and
an image processing apparatus which is configured to fetch a first image acquired by the first sub-camera module and a second image acquired by the second sub-camera module, and to output an image signal for a stereoscopic display,
the second image sensor being constituted to have a smaller number of pixels than a number of pixels of the first image sensor,
the second sub-camera module having a signal processing unit which is configured to execute signal processing for adjusting the second image depending on a difference between the numbers of the pixels of the first image sensor and the second image sensor,
the signal processing unit including:
a continuous image pickup unit which is configured to execute image pickup at a plurality of continuous times through the second image sensor over one-time image pickup through the first image sensor; and
a superposing unit which is configured to superpose a plurality of images fetched by the image pickup carried out at the times, thereby forming the second image, and
the superposing unit superposes a number of images which corresponds to a signal to noise ratio of the first sub-camera module.

* * * * *